J. M. W. KITCHEN.
MANUFACTURED AND PACKED BUTTER.
APPLICATION FILED MAR. 16, 1912.
1,072,238. Patented Sept. 2, 1913.
2 SHEETS—SHEET 2.
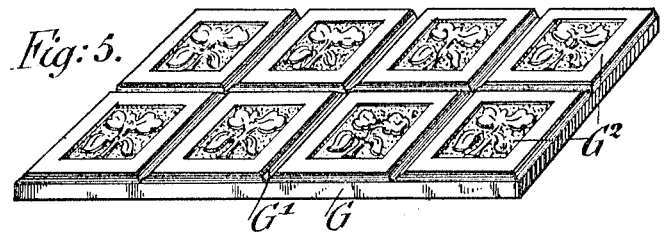
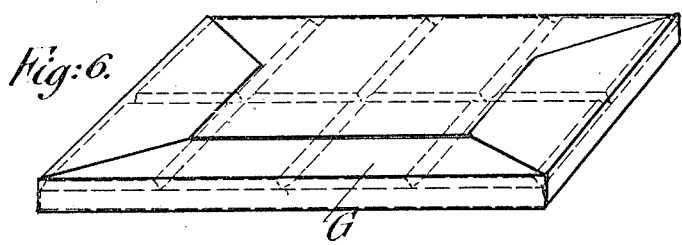
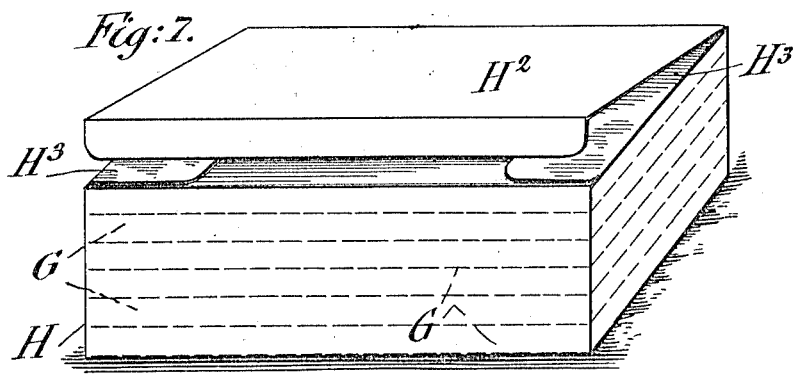
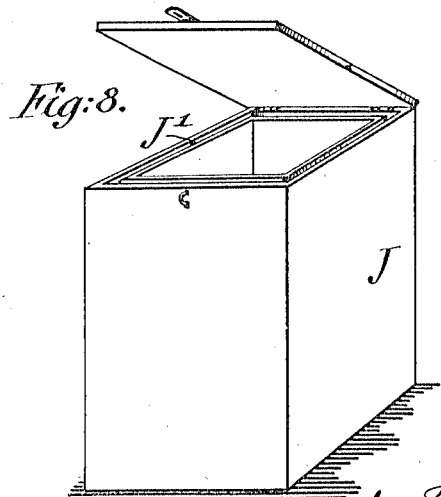
Witnesses:
C. T. Neal
Florence Jackson
Inventor
J. M. W. Kitchen
By his Attorney
Geo. L. Wheelock

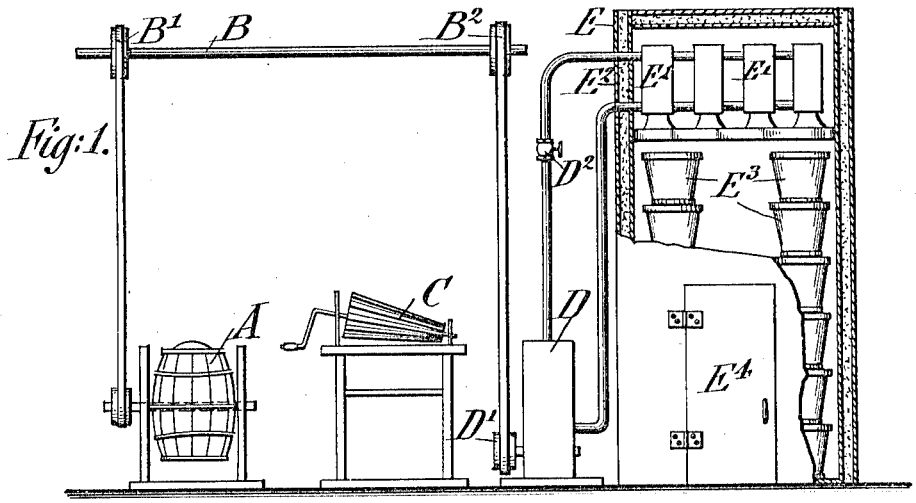
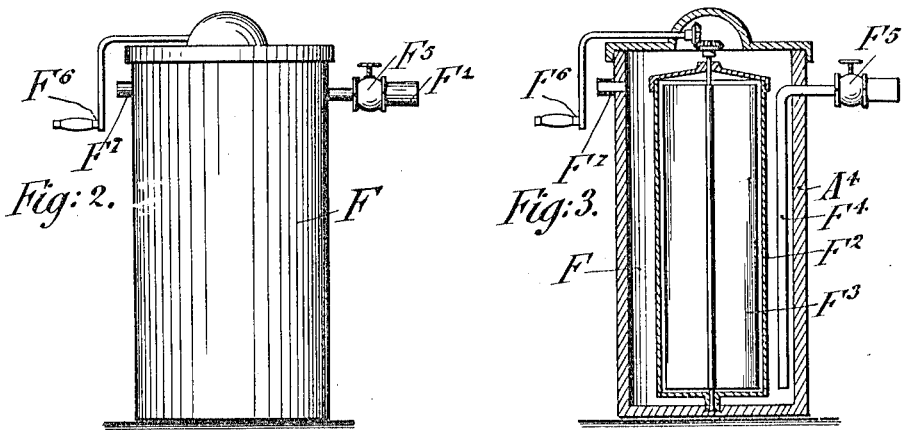
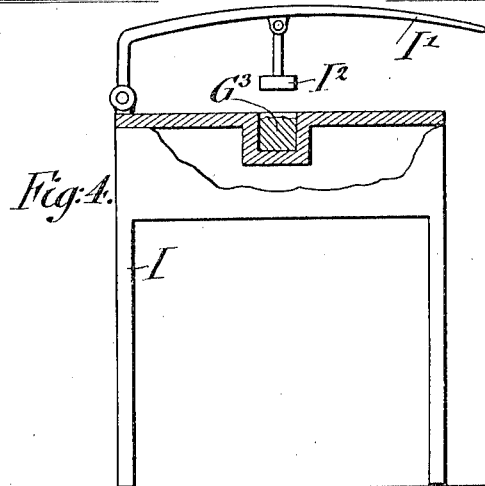

UNITED STATES PATENT OFFICE.

JOSEPH MOSES WARD KITCHEN, OF EAST ORANGE, NEW JERSEY.

MANUFACTURED AND PACKED BUTTER.

1,072,238.  Specification of Letters Patent.  Patented Sept. 2, 1913.

Original application filed August 29, 1910, Serial No. 579,538. Divided and this application filed March 16, 1912. Serial No. 684,174.

*To all whom it may concern:*

Be it known that I, JOSEPH MOSES WARD KITCHEN, a citizen of the United States, residing in the city of East Orange, county of Essex, State of New Jersey, have invented new and useful Improvements in Manufactured and Packed Butter, of which the following is a specification.

This invention relates to the improved food product made under the method of making and preserving butter which was disclosed in my previous application Serial No. 579,538, filed August 29th, 1910, of which this application is a division.

The object of the invention is to make and supply a quality of butter more satisfactory than usual to consumers in towns and cities at a considerable distance from the place of milk production, and in particular, to secure the maintenance of a satisfactory quality in the butter up to the immediate time of its consumption.

A further object is to provide a better quality of butter at a lessened cost.

Milk and butter are very perishable food products, which deteriorate rapidly in quality immediately after production under old time methods of handling. When the milk and cream, from which butter is made, is properly handled, the butter comes from the churn excellent as to fragrance and as to taste; but when not properly treated, the milk, which even when drawn from the cow may have an objectionable odor absorbed from the bodily fluids of the cow, and the cream produced from the milk, may become infected with undesirable germs including those which are pathogenic in character and which proliferate at the temperatures at which cream and newly produced butter are usually held, and which, at even the temperature maintained by icing, may soon develop odors and flavors which are objectionable in butter, either fermented or unfermented, sweet or salted.

At a date considerably prior to the date of filing this application, when milk was generally brought every day to the creamery, to be there separated by centrifugal skimming, and where fermentation of the cream was well controlled, much good butter was made. But of late, and largely owing to the practice of using the hand separator at the farm, and skimming the milk there, and with less cleanly practices in caring for the separators, and less frequent conveying of the cream to the central butter-making factory, the average quality of the butter produced has become much depreciated. This is mostly due to the growth in the milk and cream of germs of various kinds. In ordinary later day practice, cream usually reaches the creamery heavily loaded with bacteria, and contaminated with objectionable odors and flavors. Some of these bacteria may be virulent in the production of disease. Some disease germs proliferate quickly in milk, which is a good culture medium for them, as well as from non-pathogenic varieties. It is of great importance that the butter-maker should receive his cream as free from living bacteria as possible, as well as free from objectionable odors and flavors, if the maker is to produce fine quality butter.

The present invention relates to steps taken from the time of the production of the milk up to the moment of the consumption of the butter made from the milk; and the product herein claimed is secured through the practice of numerous steps taken in treating this special dairy product.

Consumers in the cities, as a rule, never taste the finest quality of butter, as most of the butter sold is of inferior quality when made and becomes more or less deteriorated before it reaches the cold storage warehouses in the cities, or before being used by the consumer. Under old methods of distribution to the consumer by the dealer from the tub in open stores, and after the butter reaches the consumer, it usually deteriorates in quality very rapidly, owing to a progressively increased fermentation in it resulting from exposure to heat, owing to the absorption of objectionable odors and flavors, and also because of infection from the atmosphere and from the germ contaminated utensils used in removing the butter from the butter packages ordinarily used, or which may be used in dividing ordinary sizes and shapes of butter prints.

The method described in my previously referred to application enables the butter makers to secure satisfactory results from more or less malodorous cream, made from milk which is produced under the usual unsanitary conditions prevailing in most farmers' barns, where the milk receives a considerable germinal infection, and at certain seasons of the year is of a malodorous quality. The improved method is effective in causing the objectionable odors and flavors, which may be present in milk when drawn from the cow, and in the cream separated from such milk, to disappear under the influence exerted by holding and aerating the cream at a low degree of frigidity for a sufficient length of time. The method also prevents the proliferation of the infective germs before obvious deterioration in the quality of the cream, or in the butter made from the cream, has occurred.

My method substitutes for the previously existing practice in the making of very high grade butter, the prevention of infection of milk and cream with germs, the new idea of preventing any objectionable fermentation of the bacteria that may have gained access to the milk or cream, even in large numbers, and also of eliminating practically all objectionable odors and flavors that may have been formed in the milk and cream. In the older method, dependence was largely placed on the ineffective method of icing to secure a retardation of fermentation in the butter; but no method was provided for completely stopping fermentation and for eliminating the odors and flavors that were formed during the retarded fermentation. In other words, the vital activity and proliferation of the larger number of living bacteria that are usually present in milk, cream and butter, are inhibited, the elimination of formed objectionable odors and flavors in the cream is effected, and the formation of new objectionable odors and flavors is prevented, the butter being consumed while still in a satisfactory edible condition.

There are certain objectionable changes which occur in butter while being stored at a deeply refrigerated temperature, especially those producing fishy flavors, that are not directly due to the proliferation of germs during the time of storage; but it is probable that such changes are due to the action or influence of previous bacterial fermentation that has occurred in the butter or cream from which it is made, and even if oxidation is a causative element in the immediate change. Hence, it will be seen that it is very desirable to primarily completely control the fermentation of milk at a very early stage after it is drawn from the cow. In making the very finest quality of butter, it has been the practice to prevent germinal infection of the milk through the use of very expensive practices, but there has been no entirely satisfactory method proposed to prevent the gradual proliferation of germs in the butter which after its making results in the formation of objectionable flavors and odors in the butter before its consumption.

My method prevents the formation of the objectionable odors and flavors in cream and butter that has been more infected primarily. The difference between my butter product and the more expensively produced article, is that while my product may have even more bacteria in it at the start, those bacteria are inactive and produce little, if any, of the undesirable flavors and odors; and for all purposes of consumption my product is as satisfactory to the gustatory taste, or even more so, than the more expensively produced article; while it has been produced, and preserved up to the moment of consumption, at a much less cost.

When the question of safety from pathogenic infection is to be considered, my butter is pasteurized; but the objectionable odors and flavors have been eliminated, and undesirable amounts of acids and enzyms have been prevented from forming in the product.

An essential feature of my invention is the modification of the method as applied to the treatment of butter that has to be sufficiently heated to destroy objectionable germs in it, and also to butter that is processed in such manner as to leave living lactic acid or other desirable germs in the butter. Inasmuch as heating cream or butter more or less injures the texture of the butter, I prefer to make butter from raw cream, and aerate the cream in an atmosphere of so low a temperature as to prevent the propagation of the germs during the aeration; but if it is desirable to heat the cream or butter for any reason, the aeration may be carried out in an atmosphere of sufficiently high temperature to destroy objectionable germs in the atmosphere and in the cream or butter that is aerated.

An essential to my invention is that the slabs into which I form my butter for final distribution should be in a condition of deep frigidity, and that that state be maintained by the refrigerative influence given to tne butter by a mechanical refrigeration. The mere refrigeration of butter by the external application of ice, as has been previously done, is a different process that does not accomplish the aim of my invention, either in preventing deterioration in the butter, or in providing for the convenient and economical handling of the butter in its distribution. As a matter of fact, butter packed in my special form of package, without the deep refrigerating performance, is not a desirable form in which to distribute the product.

The difference between my new product and older products that to superficial observation may seem the same, and which may taste and look the same, is that my product may have been made from ordinary farmer's cream heavily loaded with bacteria, and which cream has been produced by the cheap methods of ordinary farm practice, but which cream has been deprived of undesired odors and flavors by my special performance of manufacture, and in which the growth of pathogenic or other objectionable bacteria has been prevented, and in which the bacteria which may be in the butter and are still alive, are in a state of inhibition so far as vital activity is concerned. In ordinary so-called "gilt edged" butter, that butter has been produced by expensive procedures carried out in high cost plants especially created for producing milk of "certified" quality, and in which objectionable bacteria have been largely prevented from gaining access to the milk, but which, after having gained access to the milk, have not been entirely prevented from proliferating, and thus producing changes in the butter after its making. Such "gilt edged" butter is usualy kept in form by icing during transportation, but depreciates rapidly between the time of its leaving the distributer's place of business and the moment of its consumption. My method prevents this deterioration in product.

By the improved method, fermentation is preferably substantially prevented before and after the making of the butter, by cooling the cream, which should be separated from the milk immediately after it is drawn from the cow, to a temperature that will prevent objectionable fermentation in the cream prior to its churning, and by deep refrigeration of the butter immediately after its churning. To secure reasonably good results, in practice, it has been found that the separated cream, if made from milk of sufficiently excellent quality, may be kept at a temperature of about 60° F. prior to its churning if the cream is protected from absorbing objectionable odors, is protected from germ contamination, and is collected and churned at least every forty-eight hours. If cream is used in making butter which has been separated from malodorous milk, the cream is held at or is aerated for a sufficient time at a deeply refrigerated temperature until the bad odors have disappeared from the cream, and is then churned in an unfermented condition, either without or with the admixture of a liberal amount of fermented milk of a known excellence of quality.

The temperature at which the cream is refrigerated before churning varies according to the character of the cream. If the nature of its infection is doubtful, the temperature is preferably at or near to the freezing point of water, or a little lower, although in some cases it may be refrigerated temporarily much below that temperature. In case of very markedly poor quality in cream, with question as to its having pathogenic infection, the cream should be pasteurized, and should be aerated either before pasteurization at a low temperature or at a pasteurizing temperature, and is then quickly chilled to a low temperature and held at that low temperature until the time of churning. It is damaging to hold the cream for a long time at high temperatures.

At the time of this writing it is not known whether the intensity of frigidity in cream has a direct deodorizing influence on the butter or not. We know that high heat has a destructive effect on odors, flavors and color in butter, but the question is still open as to why my method of deep refrigeration produces good effects; possibly there is an oxidizing influence in causing the change, and probably there is the diffusive action of gases at work, which causes the disappearance of flavors and odors through their condensation on the refrigerating piping which I use in carrying out my method of aeration.

After churning, the butter is immediately refrigerated after its formation into the form in which it is to be shipped, and before it leaves the place of its making for shipment, either for long cold storage or for immediate consumption, at so low a temperature that undesirable bacterial proliferation in the butter is prevented. In securing this state of refrigeration, that which is mechanically produced is preferred, as the required low temperatures can more conveniently, economically and positively be produced by mechanical refrigeration than by chemical refrigeration. Icing alone is inadequate to secure the best results. In exceptional cases, as in small individual dairies, on account of the cost of installing a mechanical refrigerating apparatus, the chilling of newly made butter by the use of a salt and ice mixture may be practised; but usually it is more advantageous to utilize mechanical refrigeration in the performing method. Preferably the cream should be immediately chilled after its separation from the milk, the separation being effected while the milk retains its animal heat, and then the cream should be held at or approximately near to a non-fermentative temperature until it has been transported to the place of its manufacture into butter, where, if the cream is not churned in a sweet condition, it may be fermented under adequate control as to temperature and cleanliness. Under certain conditions, as for example, in which a good quality of milk is being produced, or in which the temperature of the cream can be well controlled at its place of production, a partial fermentation of the cream may be allowed prior to its arrival at the butter making plant.

The present invention does not necessarily comprise methods of handling the milk, or cream prior to or during churning; but it will be obvious that the improved product claimed herein may be advantageously produced in connection with the performance of other methods for securing an improved quality in butter, as for example; the entire fermentation in the cream may be prevented, and the unfermented cream can be churned in an unfermented condition alone, or in connection with an admixture of a certain proportion of fermented milk of a known and desirable quality, which may be pasteurized before its fermentation if desired.

In making the improved product, the butter, after its making and formation into slabs, or after packing in bulk, is immediately refrigerated to and held at a sufficiently low temperature to prevent substantially all fermentative changes in it until favorable opportunities offer for its sale and immediate consumption. This procedure, it will be observed, is different from cooling the butter by means of icing, evolved at moderate temperatures mechanically produced. The temperature most favorable at which to refrigerate the butter is from 6° to 0° F.; but the butter may also be further chilled to such an extent as to be maintained at a sufficiently low temperature during its shipment, when more or less heating of the butter is likely to occur.

No information is available which definitely indicate the special temperature required under various conditions to prevent the fermentative process. It is obvious that the temperature required would vary according to a number of conditions, including the fermentative changes that have occurred in the cream before and during its churning into butter. As a matter of precaution the butter should be refrigerated at a temperature much below that which can be secured by icing, which does not prevent more or less objectionable fermentative changes in the butter.

It is the aim of the improved method used, not only to refrigerate sufficiently to prevent fermentation, but also to further refrigerate the butter to a sufficient degree to prevent any fermentation in it during its conveyance to market or to the large storage warehouses of the cities, which for commercial convenience are located close to the points of distribution to the consumer; and as the distances from the point of production to the point of consumption may vary widely, it will be obvious that the refrigerative temperature required for the butter will vary according to the distance of transportation, the season, the atmospheric conditions and the temperatures to which the butter may be subjected in the cars or other vehicles while in transit, and the form in which the butter is sold to the consumer. The smaller the package of butter, the more intense should be the refrigeration.

When the butter is to be stored for a considerable time, it is usually shipped in the form of large square packages of a plurality of relatively large slabs; or if the butter is packed in tubs or round boxes, they should be of a moderate or small weight in order to secure quick chilling of the butter.

The form of butter package I use for distribution has for its object, 1st, the incasement of the butter in convenient amounts of known designated weight. 2nd, an incasement that shall be of the least possible cost that will be effective for its purpose. 3rd, that it shall be practically impervious to the passing of fluids through its texture. 4th, that it shall have a hinged cover. 5th, that the butter content shall be in subdivided prints, each print being separately enwrapped in a protective paper or other protective material. 6th, that each print shall be of a form indicating through a partial formation, the individual butter pats into which the print may be conveniently divided. 7th, that the incasement shall be sufficiently rigid to more or less prevent deformation of the prints from pressure. This specific form of package has not previously been used, and it has special commercial, sanitary and economical advantages.

When the butter is to be distributed for immediate consumption, it is made into subdivisional printed thin slabs of a thickness and size suitable for packing in pasteboard cartons. These slabs are preferably $\frac{5}{16}$ of an inch thick, $2\frac{5}{8}$ inches wide and $4\frac{3}{4}$ inches long, and each slab is printed on its surface with intersecting depression lines which partly divide the slabs into butter pats of convenient size. The faces of the pats are ornamented by some characteristic depressed imprint. This depressed form of imprint which is separate from the divisional lines permits of greater compactness in assembling the slabs in the protective carton used. In making up the carton package, each slab is preferably, but not necessarily wrapped in parchment paper, and a plurality of the slabs, preferably six, are packed in a paraffin coated paste-board carton which is stamped from a single sheet of stiff cardboard. Sometimes the slabs are not individually wrapped, as after being sufficiently chilled they do not adhere while sufficiently chilled; but where the butter is of specially fine quality, the individual wrapping of the slabs prevents the escape or loss of the finer odors and flavors of high quality butter and prevents deterioration in the unused portions of butter in the carton. In shipping butter in slab form and in a state of intense frigidity, each slab is usually formed into a size equal to the horizontal area of the package of which it is a part to prevent air contact with the butter as much as possible, though this requirement is not imperative. It will be understood that the butter, after being worked and formed, and before being finally packed for shipment, is subjected to a very low degree of refrigeration, usually at or near 0° F., and always very considerably below 32° F.

When the butter is finally packed for distribution to consumers, the cartons inclosing the refrigerated slabs are transported in insulated shipping cases of considerable size, so as to hold the butter at a low degree of temperature during its transportation and distribution. The walls of the shipping cases are preferably insulated by compressed sheets of cork. When the butter has arrived at the place for its distribution to consumers, it is still held at a very low temperature, and after its distribution to consumers, which may be done directly from the insulated carrier cases, the individual cartons are kept in the refrigerators of the consumers, the individual and partly divided slabs being only removed from the cartons immediately before the butter is to be consumed. In carrying out this method it will be seen that the butter is not touched by hand or infected implement, nor exposed to atmospheric infection from the time it leaves the place where it is produced until the time of its consumption at the table, the separate enwrapment of each slab making it more easily possible to handle the butter with the greatest possible cleanliness.

When the butter is to be stored for a considerable length of time, either at the place of production, or at or near the place of distribution, it is usually desirable to form the butter primarily into slabs of considerable size and weight; each slab being of a convenient size to pack for transportation or removal to the storage warehouse, and for convenience in re-working when the butter is to be re-subdivided into the smaller printed slabs. Such slabs are more quickly refrigerated than the butter would be if packed in large masses, as in tubs. Forming the butter primarily into slabs allows of their being more quickly warmed to a softness of texture that will permit of its easy formation into the smaller slabs, which are hardened by refrigeration again after their formation. By thus forming the butter primarily into large slabs, time is saved in its handling and re-packing, conveyance charges are less because more shipping space would be required if the smaller slabs were formed at the butter factory. Furthermore, the very finest quality of butter should be protected from the oxidizing and other influences of the direct contact with air.

Inasmuch as the butter after churning is immediately refrigerated at so low a degree of temperature as to prevent substantially all fermentation in it, and hence preserves the butter, this practice enables the farmer to produce his butter product at a very low cost from spring and summer pasture feeds that produce the finest quality of butter, and yet allows the butter to be held in good condition for sale at favorable prices at those seasons of the year when more expensive and less desirable feeds would have to be fed to the cows in order to secure a large product at those seasons.

In those cases where the butter, after its manufacture, is to be conveyed for unusually long distances, and where its consumption is to be delayed for a considerable length of time, or where there is question as to any pathogenic infection, the milk or cream is pasteurized, and the cream is then usually fermented with the aid of a pure culture starter before churning, unless it is churned without being fermented, in which case a pasteurized fermented milk may be admixed with the cream. Whenever possible, the use of a good quality unpasteurized cream fermented in the ordinary manner is to be preferred in making butter, as it is then not only more convenient for the farmer to hold the cream, but it costs less to collect and transport it from the farm to the butter factory, because of less frequent collections of the cream being required a finer product can be made than from pasteurized cream. Unpasteurized cream produces a butter that is usually preferred by consumers. When pasteurization is resorted to, the cream should be kept sweet, or nearly so, at its place of production, and must be more frequently collected. If the cream is refrigerated at the farm, some simple method of cooling the cream may be practised, as by ordinary icing or by the use of cold water. The referred to method is especially valuable in producing and marketing unfermented and unsalted butter.

It is common to refrigerate butter for long periods in deeply refrigerated storage, but only after more or less deterioration has occurred in it due to objectionable fermentation in the cream, and during the handling and transportation of the butter. In the referred to method, the cream is preferably refrigerated immediately after its separation from the milk, the cream is held or aerated quickly in deep refrigeration for a considerable time if necessary, and the butter after churning and while it is still in its best condition, is immediately refrigerated at a temperature so much below the freezing point of water as to prevent deterioration in it from fermentation. This state of frigidity is continued until the butter is placed in the hands of the consumer. It will be noted that this method substitutes a complete temperature control of cream and butter in all steps of the production of butter and in its marketing, in place of the partial and intermittent temperature control of the older practice.

Cream is frequently impregnated with odors that are formed in the body of the cow. In my method, such odors and the odors and flavors due to germinal proliferation in the milk or cream, are eliminated by a prolonged aeration in an atmosphere of a temperature that is inhibitive of bacterial growth.

In the accompanying drawings, Figure 1 represents diagrammatically in elevation, and partly in section, the principal elements in a dairy house. Figs. 2 and 3 represent respectively a side elevation and a vertical section of a pasteurizing device, drawn on a larger scale. Fig. 4 represents a sectional elevation of a lever operated butter printer. Fig. 5 is a perspective view of a thin printed slab of butter, divided into patties. Fig. 6 is a perspective view of a slab wrapped in protective material. Fig. 7 represents a perspective view of a package containing six separately wrapped butter slabs, and Fig. 8 represents a perspective view of an insulated butter shipping box.

Similar letters of reference indicate corresponding parts throughout the several figures of the drawings.

In the drawings, A is a churn, B a power shaft which may be actuated by any convenient source of power.

$B^1$ is a pulley which actuates the churn, C is a butter worker, D is a compressor for the mechanical compression of ammonia gas, $D^1$ is a pulley actuating the compressor D which is driven by the shaft B and the pulley $B^2$.

E is an insulated refrigerator, $E^1$ are cold brine tanks, $E^2$ is an insulating casing, $E^3$ are packages of butter under refrigeration, $E^4$ is a door.

$D^2$ is a valve through which the compressed ammonia is allowed to expand.

Figs. 2 and 3 represent on a larger scale the pasteurizer F which has an insulated external receptacle $A^4$, an internal cream receptacle $F^2$, a revolving stirrer $F^3$, and a hot water pipe $F^4$. $F^5$ is a valve. $F^6$ is a handle for actuating the stirrer $F^3$, and $F^7$ is an outlet for the hot water which is introduced through the pipe $F^4$.

Fig. 4 represents a lever operated butter printer I, with a lever $I^1$, press block $I^2$ and print block $G^3$, by which the thin slabs receive their imprint. G represents a thin printed slab of butter which is divided by longitudinal and transverse intersecting depressions $G^1$ into individual butter pats $G^2$. Six of these separately wrapped butter slabs are inclosed in a paraffin coated protective carton H of stiff cardboard, having the covering flap $H^2$ and the side flaps $H^3$, shown in Fig. 7. The packages are placed for shipment into an insulated butter carrier J, having insulating air spaces $J^1$, and interior cork plates.

Special emphasis is placed on the preference of forming the butter into thin slabs, and imprinting each slab in such a manner that it is partly divided into a plurality of individual pats of a size and form suitable for use at table, and in case of very fine quality butter, enwrapping each thin slab protectively so that the butter, when purchased for consumption need not be opened to the atmosphere nor touched by any implement unless its immediate consumption at the consumer's table is assured. This special form of print is that which is preferred; but the invention is not limited to this special form. So long as the principle of sub-division of the butter into individual pats, protectively incased and held at the necessary low degree of frigidity in the carriage and distribution of the butter is carried out, other forms of prints or aggregations of individual patties in a protective carton, is in harmony with the ideas of the invention. However, the special form of print preferred is by far the best for the purpose.

In the ordinary method of forming butter into prints and enwrapping the same, butter is divided into larger prints, weighing not less than one-half pound each, in which case, the entire print is either placed on the table and each individual consumer removes a portion from the unitary print, or else the butter is formed into some special, and usually large and wasteful form of butter roll, and without further deep refrigeration of the butter. In both cases more or less of the butter becomes atmospherically and otherwise infected with germs, and when, as is usually the case, some of the butter is unconsumed, rapid deterioration of the unconsumed part takes place from the action of heat and infection. A large proportion of all the butter that leaves the seller's warehouse undergoes great deterioration in quality before it is consumed. The present invention overcomes that trouble.

The special form of print I use, and its method of packing, is necessary to secure the best results in saving the aroma and flavor of the butter in distributing the butter to, and in its use by, the consumer.

Stress is laid on the immediate low refrigeration of the butter after it is made, at a temperature so much below the freezing point of water, such as 0° to 6° F., that proliferation of bacteria in the butter is substantially entirely prevented; but the improved product is of value outside of the unusually low refrigerated condition of the butter, inasmuch as the sub-divisional method of packing in the preferred form provides for the gradual removal from the inclosing carton of such amounts of butter as are needed for immediate use, in a perfect state of preservation. Through the use of this special package, not only is the quality of the butter awaiting consumption conserved, but waste in its consumption is prevented.

When the butter is stored in bulk before it is formed into the specially described thin slabs, it is kept at the stated low temperature until it is to be re-packed, when after a moderate warming to allow of its re-working into the small printed slabs, it is again intensely refrigerated, and then if of sufficiently excellent quality, is wrapped in protective paper, and then placed into the carton; or in some cases, the deeply chilled slabs are packed in the cartons without individual enwrapping of the slab.

When the butter finds a market and quick consumption close to its place of manufacture, the refrigeration of the butter before and after its packing need not be so intense. In such instances, the cooling of the butter need not be more than is necessary to enable the thin slabs to be conveniently formed and their shape maintained while being handled and distributed to the consumer; but whenever mechanical refrigeration is available, it is good practice to reduce the temperature of the butter very considerably below the freezing point of water.

By handling milk, cream and butter in the manner thus described, butter can be made, conveyed and distributed to consumers in a practically undeteriorated condition, having and retaining all the flavor, fragrance and texture of the freshly churned product of highest excellence in quality.

Inasmuch as it is important to refrigerate the butter very deeply as quickly as possible after it is churned, the value of forming the butter primarily into slabs and of then subdividing the prints into thin slabs will be obvious, as in that case the butter will be more quickly and completely chilled than if the prints are made of the usual size, or if the butter is cooled in larger masses. The thin shaping of the slabs is also of value because such forms can be more quickly and completely aired, which is sometimes a desirable practice in dissipating disagreeable odors in the butter. Sometimes the cream is aired or held for a considerable time in a deep state of refrigeration prior to the churning of the butter for the same purpose. When the butter is to be stored for a considerable time in tubs, it is better to pack it in rather small sized packages than in those of larger size; for the larger the size of the mass in which the butter is packed and held after its churning, the longer will be the time required to completely chill the entire mass. Even a few hours' delay in sufficiently cooling the butter results in some deterioration in its quality. Hence, to secure the very finest possible quality in the butter delivered to the consumer, it is desirable to form it into thin slabs, and chill the slabs quickly to a very low temperature, after which the slabs can be wrapped singly and then placed in the cartons, which are packed for final shipment and distribution in the insulated carrier-cases. When car loads of butter are to be shipped to market during the cooler seasons, because of the larger amount of cooling influence present in the car load lot, mere low refrigeration of the butter at the butter factory, without inclosing the butter packages in insulated encasements is all that is needed to protect such large bulks of butter while in transit. The icing of the cars during transit to market is helpful as an adjuvant performance.

The improved practice is of value in case butter is sold to the consumer in bulk without forming the butter into the special print packages, the latter practice being of particular value when the butter is to be used in families of moderae or small size. Besides being of value in preventing the formation of molds in unpasteurized stored butter, the referred to method is also of value in handling pasteurized butter, in which presumably few or no live germs exist; for tests have shown that without deep and immediate refrigeration of the pasteurized butter, deteriorating bacterial and chemical changes may occur and molds are likely to form on the surface of the butter mass and penetrate inwardly through the butter, the germs being conveyed from the atmosphere or from the butter package during the packing of the butter. Germs and spores that are not destroyed by pasteurization, may also proliferate in the butter if the butter is not sufficiently refrigerated. Pasteurized butter prints also retain their form longer and keep better when exposed for use if previously deeply refrigerated.

As has been intimated, under certain conditions the thin slabs are not individually wrapped in protective paper, as the unwrapped slabs will not adhere when refrigerated and maintained at the low temperature that is desirable; but when the utmost protection from germinal infection and absorption of objectionable odors is desired, and the retention of specially fine odors and flavors in the butter is wished for, the slabs are individually enwrapped.

It will be obvious that in carrying out the spirit of the invention, various modifications of the method used in producing the desired product would be practised. It will be obvious that the form of butter package herein described, and which is a preferred form, may be considerably modified and yet be within the scope of the invention. For example, the butter pats may be entirely separated from each other and be packed in a state of frigidity sufficient to prevent the pats from fusing together; or, the pats may be packed in layers, with sheets of separating paper between the layers. Various forms other than square butter pats may be used.

In this application, whenever the term "slab of butter" is used, the term means a thin or relatively thin sheet, which is to be differentiated from a thick cake, mass or lump of butter. The slab formed is more quickly chilled, and is more quickly warmed if the butter is to be re-packed. It is the preferred form for use, as the individual flat thin prints, when removed from the ice chest, soften to a spreading consistency at table more quickly than other forms of pats. This form of print is not to be confounded with the thick slabs of individual pats that have previously been used.

It is not known just why cream and butter when exposed to the influence of air at a non-fermentative temperature loses objectionable odors; but it is thought to be a process of slow oxidation. This disappearance of malodors will occur if cream is held for a sufficient length of time at a low temperature in moderate quantities. But inasmuch as it is possible that the process is one of slow oxidation, it is obvious that if the cream is more quickly exposed with an extended surface of the cream to air at the stated low degree of refrigeration, the process of deodorization will be hastened. This performance could be carried out by using any of the well known devices for cooling and aerating milk. In carrying out the method with very large amounts of cream, it will probably be advisable to aerate the cream in some such manner by pumping the cream in cycle over aerating surfaces or by pumping air through the cream at the stated low temperature until the desired deodorization is effected.

Subject matter is herein disclosed which is not herein claimed, but which is claimed in my copending application Serial No. 692,196, filed April 20th, 1912.

What I claim as new is:

1. As a new product, butter, the constituents of which have been aerated at a temperature inhibitive of germinal proliferation, and that immediately after its churning has been refrigerated at a temperature sufficiently below the freezing point of water to substantially entirely inhibit bacterial growths in the butter, said butter being free from objectionable odors and flavors of germinal proliferation, said freedom being due to said aeration, said butter having a bacterial content in a non-proliferating state of inhibition.

2. As a new product, butter that has been in a state of frigidity immediately after its making, at the place of its making, during its transit to market, during storage prior to distribution to consumers, and during its distribution to consumers sufficiently below the freezing point of water to prevent proliferation of germs in the butter, said temperature being also sufficiently low to allow of some increase of heat manifestation in the butter during its transportation, storage and distribution, without the butter having attained a germ proliferating temperature, said product substantially maintaining the condition produced by said treatment, the germs in said butter being in a state of vital inhibition, said butter being substantially free from objectionable flavors and odors due to the vital activity of germs.

3. As a new product, a flat, thin slab of butter, such as has been herein described, and for the purpose set forth, said slab being in a state of frigidity sufficiently below the temperature securable by the process of externally icing the butter to substantially inhibit bacterial activity in the butter, said butter having continually been in said state of frigidity from a time immediately subsequent to the churning of the butter, said butter being free from odors and flavors developed by germinal activity in the butter after its making.

4. As a new product, a slab of butter of a thinness herein described and for the purpose set forth, said slab being partly divided by intersecting lines into square individual butter pat sub-divisions, said slab being in a condition of frigidity lower than a state of frigidity produced by external icing of the slab, the butter in said slab being in a condition inhibiting germinal proliferation.

5. As a new product and article of commerce, a package of butter, said package containing a plurality of flat slabs of a thinness as herein described and for the purpose set forth, said slabs being in a condition of frigidity sufficiently below the temperature securable by an external application of ice to the slabs to prevent bacterial growth in the butter, the bacteria in the slabs being in a state of inhibition as to vital activity, the slabs collectively being inclosed in a stiff protective incasement preventing deformation of the slabs, infection of and other deteriorations in the butter.

6. As a new product and article of commerce, a package of butter, said package containing a plurality of flat slabs of butter of a thinness herein described and for the purpose set forth, each slab being wrapped in a protective covering, the slabs collectively being inclosed in a stiff cardboard protective carton, said carton being composed of a stamped individual sheet of cardboard, said package being in a state of frigidity deeper than a state of frigidity capable of being produced by an external application of ice.

7. As a new product and article of commerce, a package of butter, said butter being divided into individual butter pats, said butter pats being in a condition of frigidity sufficiently deep to prevent bacterial proliferation in the butter and to prevent adhesive fusion of the pats, said package comprising a stiff protective carton containing and protecting the butter in the package.

8. As a new product and article of commerce, a package of butter composed of a plurality of layers of individual butter pats of a thinness herein described and for the purpose set forth, said layers being separated from each other by a dividing material such as parchment paper, said layers being contained in and protected by a stiff inclosing carton, said butter being in a non-fermentative condition of frigidity.

9. As a new product and article of commerce, a package consisting of thin slabs of butter, the slabs collectively being inclosed in a stiff carton for containing, maintaining form in the slabs, and preventing deterioration of the butter in the slabs, said butter having been deprived of objectionable odors and flavors by aeration in an atmosphere of a temperature inhibiting bacterial growth, and being free from said odors and flavors, said butter having been refrigerated after its making at a temperature inhibiting bacterial growths, and having been and being maintained in such state of inhibitory temperature.

10. As a new product and article of commerce, a butter package consisting of a plurality of thin slabs of butter, each of the slabs being wrapped individually and the wrapped slabs collectively being incased in a containing stiff protective carton, the butter in the package being in a state of frigidity sufficiently below the freezing point of water to inhibit bacterial growth in the butter and to provide a sufficient reserve of refrigerating influence to prevent such rises of temperature in the butter as would induce bacterial growths in the butter.

11. As a new product, butter the constituents of which have been subject to sufficient heat to kill pathogenic germs, said butter being free from living pathogenic germs and being in a state of frigidity sufficiently deep to inhibit bacterial growths in the butter, said butter being free from objectional odors and flavors due to the proliferation of objectionable germs in the butter or in the milk and cream from which the butter has been made.

12. As a new product, a package of butter comprising a plurality of inwrapped elongated butter prints conveniently formed for sub-division into individual butter pats, a stiff cardboard carton incasing the prints, said butter being free from pathogenic germs and being free from other germs in a vital state of activity, said package being in a state of frigidity inhibiting bacterial growths, said prints being of a shape and size and being so packed that one print may be removed from the carton without exposing the butter in any other part to atmospheric infection from germs.

13. As a new product and article of commerce, a package of butter, said package comprising a plurality of enveloped wrapped butter prints, each print being of a form to indicate in part a plurality of individual butter pats and to conveniently provide for the complete sub-division of the prints into the individual butter pats, said package comprising an incasing carton, said carton being composed of one stamped sheet of material and comprising a hinged cover when formed into the carton, said carton being treated with moisture resisting material such as paraffin.

14. As a new product, butter that has been refrigerated immediately after its making at a temperature sufficiently low to substantially immediately inhibit bacterial growth in the butter, said butter being free of bacteria in a condition of proliferating activity and retaining the delicate, refined odors and flavors of freshly churned butter, which odors and flavors more or less quickly disappear if the butter is held at a temperature allowing of bacterial proliferation in the butter.

15. As a new product, butter that has been refrigerated immediately after its making, at a temperature sufficiently low to inhibit bacterial growth in the butter, said butter being free of the products produced by proliferating bacteria at a temperature allowing bacterial growth, and which products undergo change during cold storage, and which changed products damage the butter, but which changes do not directly result from bacterial proliferation in the stored butter during its cold storage.

16. As a new product, butter that has been freed from odors and flavors produced by bacterial proliferation, and which butter has been immediately after its making refrigerated at a temperature inhibiting bacterial growth, said butter being free from malodors and flavors due to undesirable bacterial growths, and being free from bacteria in a state of vital activity.

JOSEPH MOSES WARD KITCHEN.

Witnesses:
GEO. L. WHEELOCK,
BEATRICE MIRVIS.